United States Patent [19]

Hodgson

[11] 4,101,078
[45] Jul. 18, 1978

[54] FLAIL TYPE MANURE SPREADER WITH ADJUSTABLE HOOD

[75] Inventor: James H. Hodgson, Vinton, Iowa

[73] Assignee: Chromalloy American Corporation, New York, N.Y.

[21] Appl. No.: 794,146

[22] Filed: May 5, 1977

[51] Int. Cl.² .............................................. A01C 3/06
[52] U.S. Cl. .................................... 239/651; 239/658
[58] Field of Search ............................... 239/658, 651

[56] References Cited

U.S. PATENT DOCUMENTS

| | | | |
|---|---|---|---|
| 3,121,568 | 2/1964 | Wilkes et al. | 239/658 |
| 3,174,757 | 3/1965 | Ferris | 239/658 |
| 3,294,406 | 12/1966 | Wood | 239/658 X |
| 3,415,455 | 12/1968 | Ferris | 239/658 |
| 3,856,210 | 12/1974 | Hodgson | 239/658 |

Primary Examiner—Robert W. Saifer
Attorney, Agent, or Firm—Wegner, Stellman, McCord, Wiles & Wood

[57] ABSTRACT

A flail type manure spreader is provided with a hood that is mounted for bodily movement transversely of the spreader container between a first position in which its discharge side is generally contiguous to the discharge side of the container and a second position in which it straddles the other side of the container. The hood has end walls outside the container end walls that have rollers near the hood discharge side which ride in tracks on the container end walls, and the second side of the hood is carried on links which are mounted on a torsion tube that extends the length of the container. A hydraulic piston is operatively connected to one of the links to move the hood. Overlapping portions of the container end walls and the hood end walls make an effective seal located internally of the tracks, to protect the tracks and rollers from being fouled.

17 Claims, 3 Drawing Figures

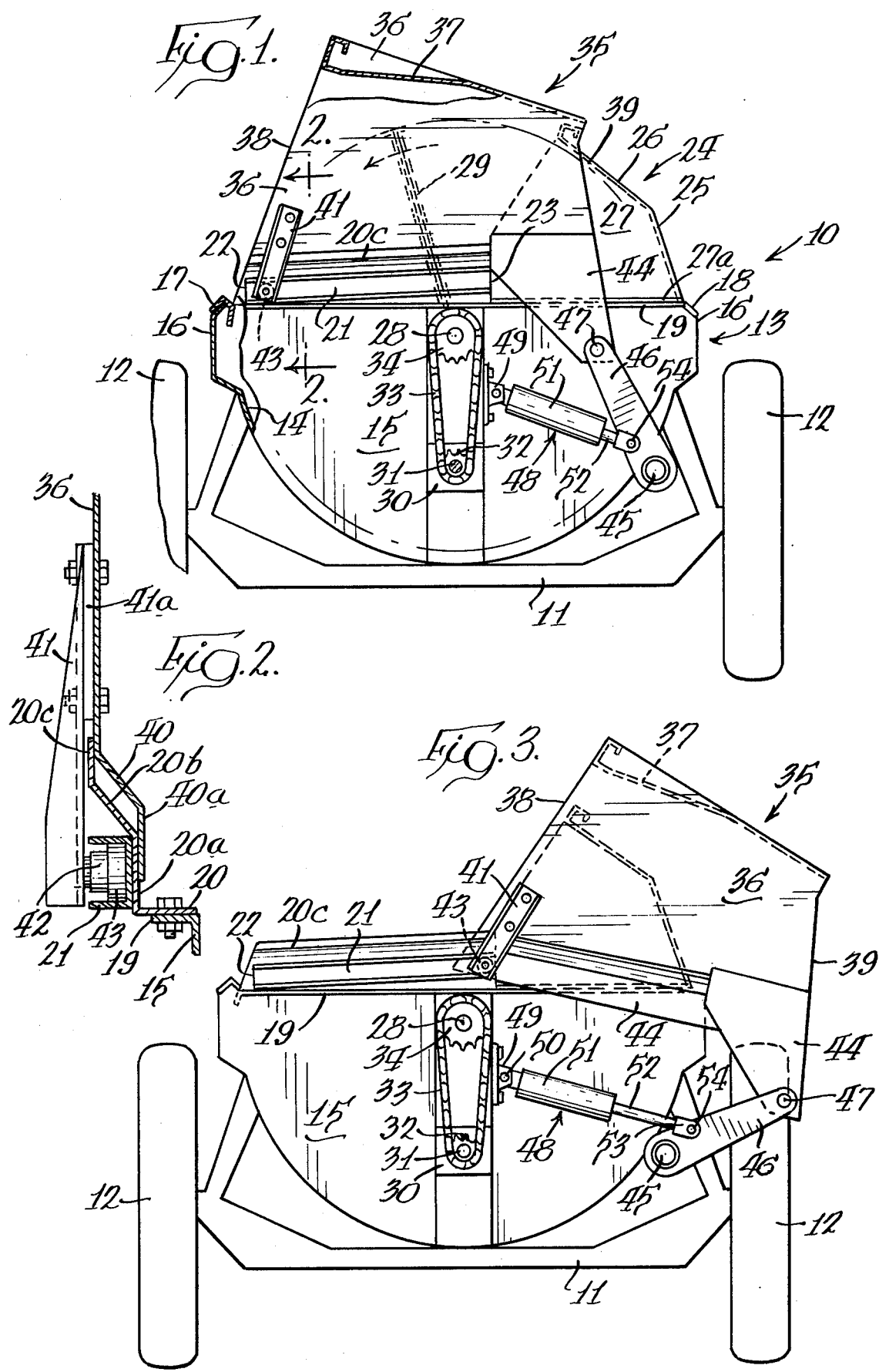

FLAIL TYPE MANURE SPREADER WITH ADJUSTABLE HOOD

BACKGROUND OF THE INVENTION

Flail type manure spreaders were first disclosed in Elwick U.S. Pat. No. 2,886,332. Such spreaders have a container which is essentially a semi-cylindrical tank with upright end walls, and a longitudinal shaft on the axis of the cylinder carries flexible flails which fling the contents over a side of the container which is called, for convenience, the discharge side. The opposite side of the container is herein referred to as the rear side; and movement of an element between the discharge side and the rear side is termed "fore-and-aft" movement. The foregoing terminology is used only for convenience of definition in the present application, because the discharge side of the container may be to one side of the path of travel of the spreader, or may be transverse to the path of travel and at the rear with respect to the direction of movement.

All flail type spreaders require some sort of shield or hood which extends upwardly from the rear side of the container and toward the discharge side so as to direct material flung by the flails over the discharge side. It has been found that such spreaders perform better with a shield or hood which has its free edge pretty close to the vertical plane of the discharge side of the container, and this requires that at least part of the hood be moved away from the discharge side to facilitate loading of the container which is most commonly done from the discharge of a barn gutter cleaner or by means of a front end loader.

Most prior art flail type spreaders have a hood which includes a fixed portion along the rear side of the container and one or more hinged portions which may be swung back for container loading. Such a structure is disclosed in Hodgson U.S. Pat. No. 3,856,210.

A different approach is found in Wilkes et al U.S. Pat. No. 3,121,568, in which a hood which is approximately one quarter of a cylinder is hinged along the rear side of the container and pivoted outwardly and upwardly around the hinge. In this apparatus the flail shaft is journalled in the end walls of the hood, and thus swings out of the way for loading.

A third approach is that of Wood U.S. Pat. No. 3,294,406, in which the hood has vertically spaced rollers outside its end walls which ride above and below complementary inturned tracks which extend fore and aft along the top edges of the container end walls. In the Wood construction, the hood translates horizontally away from the discharge side of the container to a loading position in which it straddles the rear side of the container.

While all of the above described constructions are perfectly satisfactory for their intended purposes, each of them presents practical problems in operation. In the first place, it is sometimes necessary for a flail type manure spreader to be moved into a filling location which has relatively little vertical clearance, so any movement of the hood which increases the overall height of the unit may create problems. Further, there may also be side clearance problems which make it desirable that when the hood is in its loading position it not extend very far over the wheel at that side of the spreader chassis. Insofar as the segmented and hinged hoods are concerned, their length and weight generally requires the use of a fairly large stiffening or rigidifying brace that extends the entire length of the hinged part of the hood; and this adds to the cost. In addition, particularly on large spreaders such hinged hood segments are heavy enough to require some sort of a system of levers to move them. Since such levers, or a hydraulic cylinder for moving the cover segments, should be located at only one end of the container, the hinged segments must pivot around heavy torsion tubes.

In addition, the prior art spreader hoods are not adjustable to different positions above the container for spreading material of different characteristics. There is a substantial advantage to being able to so adjust the hood.

SUMMARY OF THE INVENTION

The present invention provides a movable hood structure for a flail type spreader which moves bodily between a discharge position and a loading position, and which does so while slightly reducing the overall height of the unit and without projecting an excessive distance over the wheel in its loading position.

In addition, the hood structure of the present invention may be moved a short distance from its normal, working position and still function as a hood during discharge in the usual way. This is desirable because different materials have different splatter characteristics when discharged from a flail type spreader, and adjustment of the hood may provide improved performance with various types of material.

THE DRAWINGS

FIG. 1 is an end elevational view, partly in section, of a spreader with the hood of the present invention in discharge position, the view being from the end of the spreader which is toward the tractor in operation, and the draft tongue being omitted for clarity;

FIG. 2 is a fragmentary sectional view on an enlarged scale taken substantially as indicated along the line 2—2 of FIG. 1; and FIG. 3 is a view like FIG. 1 with the hood in its fully open position.

DETAILED DESCRIPTION OF THE INVENTION

A flail type spreader, indicated generally at 10, consists generally of a chassis 11 provided with ground wheels 12, and a container, indicated generally at 13, mounted on the chassis. The container 13 is substantially one-half a cylinder, and it consists of an arcuate longitudinal body panel 14 and substantially semi-circular upright end walls such as the end wall 15 seen in the drawings. As best seen at the left of FIG. 1, the arcuate body panel 14 has formed, integral longitudinal rails 16 extending along its two sides. As seen in FIGS. 1 and 3, the left container side 17 is a discharge side and the right container side 18 is a rear side. As seen in FIG. 2, the end walls 15 and 16 have out-turned sills 19 adjacent their upper ends. Angle members 20 mounted on the sills have upright webs 20a which mount channel-shaped tracks 21, and inclined webs 20b which overlie the tracks have upright upper portions 20c. As seen in FIG. 3, the tracks 21 extend fore and aft with first ends 22 adjacent the discharge side of the container 13 and second ends 23 which are slightly toward the rear side of the vertical median plane of the container. The angle members 20 are co-extensive with the tracks and serve as upward extensions of the forward parts of the end walls 15. The tracks 21 are substantially horizontal, but are inclined slightly upwardly toward the rear.

At the rear side 18 of the container is a fixed shield, indicated generally at 24, which comprises a pair of angularly related longitudinal plates 25 and 26 and end plates, such as the plate 27, which have outturned mounting flanges 27a on the sills 19 to the rear of the brackets 20, and which are coplanar with the end walls 15.

A flail shaft 28 is journalled in the end walls 15 of the container on the axis of the cylinder of which the container is substantially one-half, and secured in spaced relation along the shaft 28 are the usual flexible flails 29. A structural member 30 on the wall 15 supports an input shaft 31 which is adapted to be driven from a tractor P.T.O., and an input sprocket 32 drives the flail shaft 28 through a roller chain 33 and drive sprocket 34 in the usual manner.

The hood of the present invention is indicated generally at 35, and consists of end walls 36 which lie outside the container end walls 15 and which are connected by a top wall 37. The hood has a discharge side 38 and a rear side 39, and projects a substantial distance above the container. As best seen in FIG. 2, the lower portions 40 of the hood end walls extend diagonally inwardly above the inclined webs 20b and have depending extremities 40a which are in sliding contact with the webs 20a so as to protect the tracks 21 and rollers 43 from becoming fouled with material being discharged from the container.

At the lower part of the discharge side 38 of the hood end walls 36 are brackets 41 which carry spindles 42 for rollers 43 that ride in the channel shaped tracks 21. Shims 41a may be used, if needed, for the brackets 41 to clear the tracks.

At the rear portion of the hood 35 are depending brackets 44, and the rear of the hood is carried upon a torsion tube 45 which is secured to the chassis 11 and container 13 and extends outwardly beyond both container end walls 15. Pivoted upon the two end portions of the torsion tube 45 are links, such as the link 46; and the links are pivoted, as at 47, to the brackets 44, so the rear portion of the hood is supported upon the links 46.

Movement of the hood 35 between the discharge position of FIG. 1 and the loading position of FIG. 3 is effectuated by a hydraulic cylinder unit, indicated generally at 48, which is carried upon the structural member 30 by means of a yoke 49 which receives a pivot 50 for cylinder 51 of the unit 48. A piston rod 52 of the unit 48 has a yoke 53 at its outer end which is pivotally connected at 54 to the adjacent link 46. The hydraulic cylinder unit 48 is operated from the tractor hydraulic system under the control of the tractor operator, in the usual way.

It is seen that in the discharge position of FIG. 1 the discharge side 38 of the hood 35 essentially forms a projection of the discharge side of the container; while in the loading position of FIG. 3 the hood top plate 37 is entirely to the rear of the upper margin of the fixed shield 24, so that it does not interfere in any way with the loading of the container.

In addition, it is quite apparent that the hood 35 may be positioned for the discharge of material at any desired location between the illustrated discharge position of FIG. 1 and the fully open position of FIG. 3. However, as a practical matter the discharge side 38 of the hood ordinarily will be somewhere between the position of FIG. 1 and a position in which the upright discharge sides of the hood end walls 36 are vertical, and thus slightly toward the discharge side with respect to the shaft 28. In addition, it can be seen in FIG. 3 that while the hood straddles the rear side 18 of the container in loading position, the rear side 39 of the hood is only a very short distance outside the line of the adjacent wheel 12.

It is apparent from FIG. 2 that the depending extremities 40a of the hood end walls are outside the edges 19a of the sills 19, so that in loading position parts of the extremities 40a lie outside the sills.

The foregoing detailed description is given for clearness of understanding only and no unnecessary limitations should be understood therefrom as modifications will be obvious to those skilled in the art.

I claim:

1. In a manure spreader of the type having a wheeled container which is substantially one-half a cylinder having upright, substantially semi-circular end walls, a driven shaft journalled on said end walls on the longitudinal axis of the cylinder, and flexible flails on the shaft to discharge manure over a discharge side of the container, and a fixed shield extending upwardly from a rear side of the container toward said discharge side, the improvement comprising, in combination:

a hood having a top wall and upright end walls which are principally above said container end walls with lower portions overlapping the container end walls, said hood having a discharge side which is high above the discharge side of the container and having a rear side which is a short distance above the fixed shield;

mounting means on the container operatively connected to said hood end walls and supporting the hood for fore-and-aft movement on the container between a first position with its discharge side contiguous to the discharge side of the container and a second position straddling said rear side of the container;

and power operated means connected to said mounting means for moving the hood between said first and second positions.

2. The combination of claim 1 in which the mounting means provides substantially horizontal movement of the discharge side of the hood and rearward and downward movement of the rear side thereof.

3. The combination of claim 2 in which the mounting means includes substantially horizontal external tracks on the container end walls close to their upper margins, and internal rollers on the hood end walls which ride in said tracks.

4. The combination of claim 3 in which the rollers are adjacent the corners of the end walls at the discharge side of the hood and the mounting means further includes links pivotally mounted on the container close to said rear side thereof and pivotally connected to the hood end walls close to the rear side of the hood.

5. The combination of claim 4 which includes a torsion tube mounted on and extending from end to end of the spreader immediately outside the container, and in which the links are pivoted on said torsion tube.

6. The combination of claim 4 in which the power operated means comprises a hydraulic cylinder and piston pivotally supported on a container end wall and pivotally connected to one of the links.

7. The combination of claim 6 in which the power operated means consists of a single hydraulic cylinder, a torsion tube is mounted on and extends from end to end of the spreader immediately outside the container, and the links are pivoted on said torsion tube.

8. In a manure spreader of the type having a wheeled container which is substantially one-half a cylinder having upright, substantially semi-circular end walls, a driven shaft journalled on said end walls on the longitudinal axis of the cylinder, and flexible flails on the shaft to discharge manure over a discharge side of the container, the improvement comprising, in combination:
a hood having a top wall and upright end walls which are principally above said container end walls with lower portions overlapping the container end walls, said hood having a discharge side which is high above the discharge side of the container and having a lower rear side;
mounting means on the container operatively connected to said hood end walls and supporting the hood for fore-and-aft movement on the container between a first position with its discharge side contiguous to the discharge side of the container and a second position straddling said rear side of the container, said mounting means providing substantially horizontal movement of the discharge side of the hood and rearward and downward movement of the rear side thereof;
and power operated means connected to said mounting means for moving the hood between said first and second positions.

9. The combination of claim 8 in which the mounting means includes substantially horizontal external tracks on the container end walls close to their upper margins, and internal rollers on the hood end walls which ride in said tracks.

10. The combination of claim 9 in which the rollers are adjacent the corners of the end walls at the discharge side of the hood and the mounting means further includes links pivotally mounted on the container close to said rear side thereof and pivotally connected to the hood end walls close to the rear side of the hood.

11. The combination of claim 10 which includes a torsion tube mounted on and extending from end to end of the spreader immediately outside the container, and in which the links are pivoted on said torsion tube.

12. The combination of claim 8 which includes a fixed shield extending upwardly from said second side of the container toward said first side, and in which the second side of the hood top wall is directly above said shield in the first hood position and the discharge side of the hood top wall is close to the upper margin of said shield in the second hood position.

13. The combination of claim 12 in which the fixed shield has end plates substantially in the vertical plane of the container end walls, the portion of each container wall forward of the hood is provided with an upward extension which has a portion that is inclined outwardly with reference to the container end wall, and in which the hood end walls have lower end portions which extend diagonally inwardly and downwardly so as to lie inside said container end wall extensions.

14. The combination of claim 13 in which the lower end portions of the hood end walls are effectively in sliding contact with the upward extensions of the container end walls.

15. The combination of claim 13 in which the mounting means includes substantially horizontal external tracks mounted upon the upward extensions of the container end walls, and internal rollers carried on the hood end walls which ride in said tracks.

16. The combination of claim 8 in which the fixed shield has end plates substantially in the vertical plane of the container end walls, the portion of each container wall forward of the hood is provided with an upward extension which has a portion that is inclined outwardly with reference to the container end wall, and in which the hood end walls have lower end portions which extend diagonally inwardly and downwardly so as to lie inside said container end wall extensions.

17. The combination of claim 16 in which the lower end portions of the hood end walls are effectively in sliding contact with the upward extensions of the container end walls.

* * * * *